United States Patent
Merems (12)

(10) Patent No.: US 9,696,125 B2
(45) Date of Patent: Jul. 4, 2017

(54) THERMAL TRIGGER WITH AN INTEGRATED OUT-OF-LINE LOCKOUT DEVICE FOR A THERMALLY-INITIATED VENTILATION SYSTEM OR OTHER SYSTEM

(71) Applicant: Raytheon Company, Waltham, MA (US)

(72) Inventor: Paul A. Merems, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 74 days.

(21) Appl. No.: 14/802,683

(22) Filed: Jul. 17, 2015

(65) Prior Publication Data
US 2017/0016706 A1   Jan. 19, 2017

(51) Int. Cl.
*F02K 9/38* (2006.01)
*F42C 19/08* (2006.01)
*F42C 15/44* (2006.01)

(52) U.S. Cl.
CPC .............. *F42C 19/08* (2013.01); *F42C 15/44* (2013.01); *F02K 9/38* (2013.01)

(58) Field of Classification Search
CPC .. F42B 39/14; F42B 39/20; F02K 9/38; F02K 9/32; F42C 15/16; F42C 15/20; F42C 15/21; F42C 15/22; F42C 15/24; F42C 15/26; F42C 15/34; F42C 15/44; F42C 99/00; F42C 15/005; F42C 15/18; F42C 15/184
USPC ....... 102/221, 231, 233, 235, 237, 239, 244, 102/245–247, 265, 481, 249, 293, 222, 102/253, 501
See application file for complete search history.

(56) References Cited

U.S. PATENT DOCUMENTS

| | | | | |
|---|---|---|---|---|
| 3,511,183 | A | * | 5/1970 | Geffner .................. F42C 15/00 102/229 |
| 4,471,698 | A | * | 9/1984 | Rentfrow .................. F42C 1/02 102/234 |
| 4,782,757 | A | * | 11/1988 | Carter ..................... F42C 15/22 102/252 |

(Continued)

OTHER PUBLICATIONS

Graham, K.; "Mitigation of Fuel Fire Threat to Large Rocket Motors by Venting"; AFMC; AFRL-RZ-ED-TP-2010-368; Jan. 9, 2010; 33 pages.

(Continued)

*Primary Examiner* — John D Cooper

(57) ABSTRACT

A device includes a thermal trigger having a firing pin, where the thermal trigger is configured to move the firing pin in response to an elevated temperature. The device also includes an out-of-line lockout device configured to disarm the thermal trigger in response to acceleration of the lockout device. The lockout device is configured to move a first lockout ball into a notch of the firing pin to disarm the thermal trigger. The lockout device could include an inertial mass configured to move the first lockout ball into the notch of the firing pin and a first spring configured to bias the inertial mass in an initial position. The lockout device could also include a second lockout ball configured to move into a position that prevents the inertial mass from returning to the initial position or a dampener configured to slow movement of the inertial mass.

20 Claims, 5 Drawing Sheets

(56) References Cited

U.S. PATENT DOCUMENTS

| | | | | |
|---|---|---|---|---|
| 4,843,965 A * | 7/1989 | Merzals | ............... | F42B 39/20 |
| | | | | 102/205 |
| 4,949,639 A * | 8/1990 | Burns | ................. | F42C 15/36 |
| | | | | 102/249 |
| 5,129,305 A * | 7/1992 | Reilly | ................. | B23K 7/08 |
| | | | | 102/364 |
| 6,382,232 B1 * | 5/2002 | Portmann | ............ | F16K 13/06 |
| | | | | 102/275.1 |
| 2007/0261585 A1 * | 11/2007 | Chamlee | ............... | F42C 1/04 |
| | | | | 102/255 |
| 2012/0055365 A1 * | 3/2012 | Ritchie | ................ | F42C 1/04 |
| | | | | 102/226 |
| 2015/0000546 A1 * | 1/2015 | Kotefski | ............ | B65D 90/36 |
| | | | | 102/481 |

OTHER PUBLICATIONS

Sanford, et al.; "Insensitive Munitions (IM) Improvement MK22 Mod 4 Rocket Motor"; 2009 Insensitive Munitions & Energetic Materials Tech Symposium; NSWC; Tucson, AZ; May 11-14, 2009; 30 pages.

Swain, et al.; "Active Mitigation: Rocket Initiator Thermally Activated (RITA) Insensitive Munitions (IM) Device for the MK22 Mod 4 Rocket Motor"; 2012 NDIA Fuze Conference; NSWC; Indian Head, MD; May 14 & 16, 2012; 26 pages.

Tanner Research, Inc.; "In-line Electronic TIVS with Thermoelectric Scavenging"; N142-108-0761; www.tanner.com; Navy SBIR FY2014.2; 1 page.

* cited by examiner

THERMAL TRIGGER WITH AN INTEGRATED OUT-OF-LINE LOCKOUT DEVICE FOR A THERMALLY-INITIATED VENTILATION SYSTEM OR OTHER SYSTEM

TECHNICAL FIELD

This disclosure is generally directed to venting systems for missiles, rockets, or other flight vehicles. More specifically, this disclosure is directed to a thermal trigger with an integrated out-of-line lockout device for a thermally-initiated ventilation system or other system.

BACKGROUND

Missiles, rockets, and other flight vehicles are routinely stored in storage depots, on naval vessels, or at other locations. If a fire occurs at one of these locations, flight vehicles at that location could be heated until explosive materials in the flight vehicles ignite. If a casing that surrounds the explosive material in a flight vehicle is heated slowly, the casing can actually retain much of its original strength, even though the casing reaches an elevated temperature. As a result, ignition of the explosive material can actually result in detonation of the flight vehicle. This is clearly undesirable, particularly when the flight vehicle is located where people can be harmed or killed and equipment can be damaged from the resulting detonation.

SUMMARY

This disclosure provides a thermal trigger with an integrated out-of-line lockout device for a thermally-initiated ventilation system or other system.

In a first embodiment, a device includes a thermal trigger having a firing pin, where the thermal trigger is configured to move the firing pin in response to an elevated temperature. The device also includes an out-of-line lockout device configured to disarm the thermal trigger in response to acceleration of the lockout device. The lockout device is configured to move a first lockout ball into a notch of the firing pin to disarm the thermal trigger.

In a second embodiment, a system includes a motor casing and a device having a thermal trigger and an out-of-line lockout device. The thermal trigger includes a firing pin, and the thermal trigger is configured to move the firing pin in response to an elevated temperature and trigger an explosive device that damages the motor casing. The out-of-line lockout device is configured to disarm the thermal trigger in response to acceleration of the lockout device. The lockout device is configured to move a first lockout ball into a notch of the firing pin to disarm the thermal trigger.

In a third embodiment, a method includes disarming a thermal trigger having a firing pin, where the thermal trigger is configured to move the firing pin in response to an elevated temperature. Disarming the thermal trigger includes using an out-of-line lockout device to disarm the thermal trigger in response to acceleration of the lockout device, where the lockout device is configured to move a first lockout ball into a notch of the firing pin to disarm the thermal trigger.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
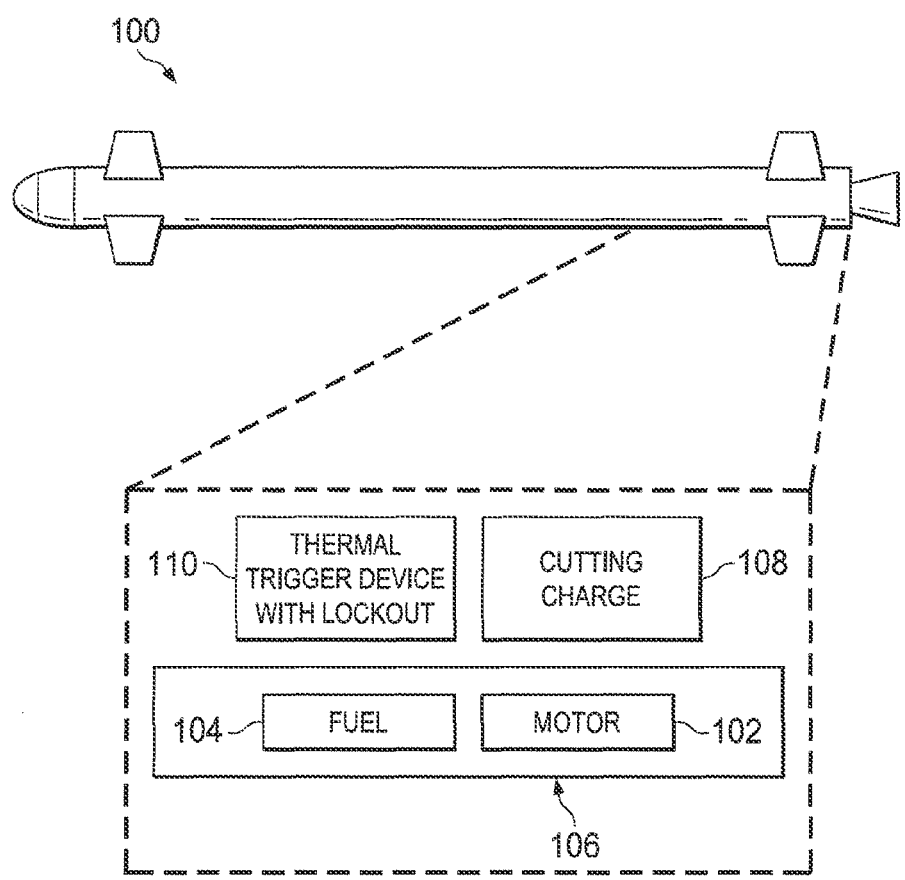
FIG. 1 illustrates an example flight vehicle having a thermally-initiated ventilation system in accordance with this disclosure.
Figure 2A:
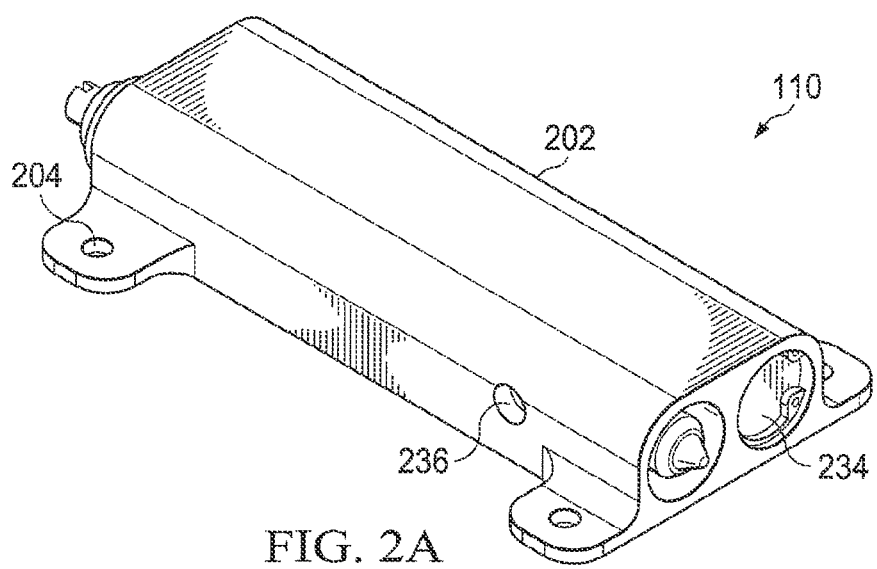
FIGS. 2A through 2D illustrate an example thermal trigger device with an out-of-line lockout device for a thermally-initiated ventilation system or other system in accordance with this disclosure.
Figure 2B:
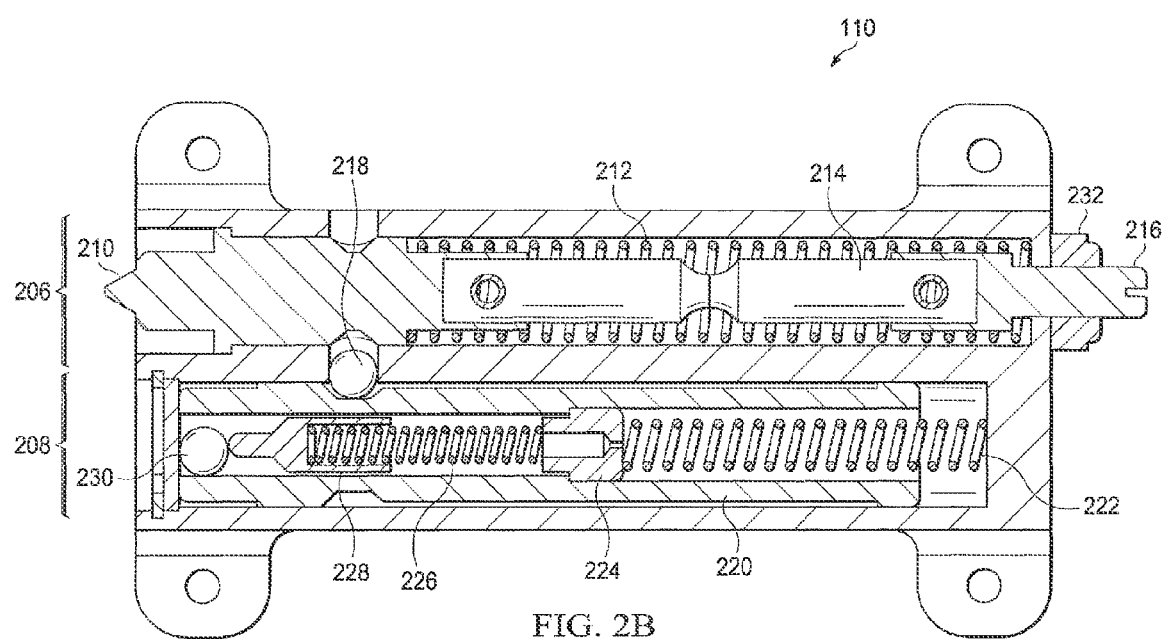
Figure 2C:
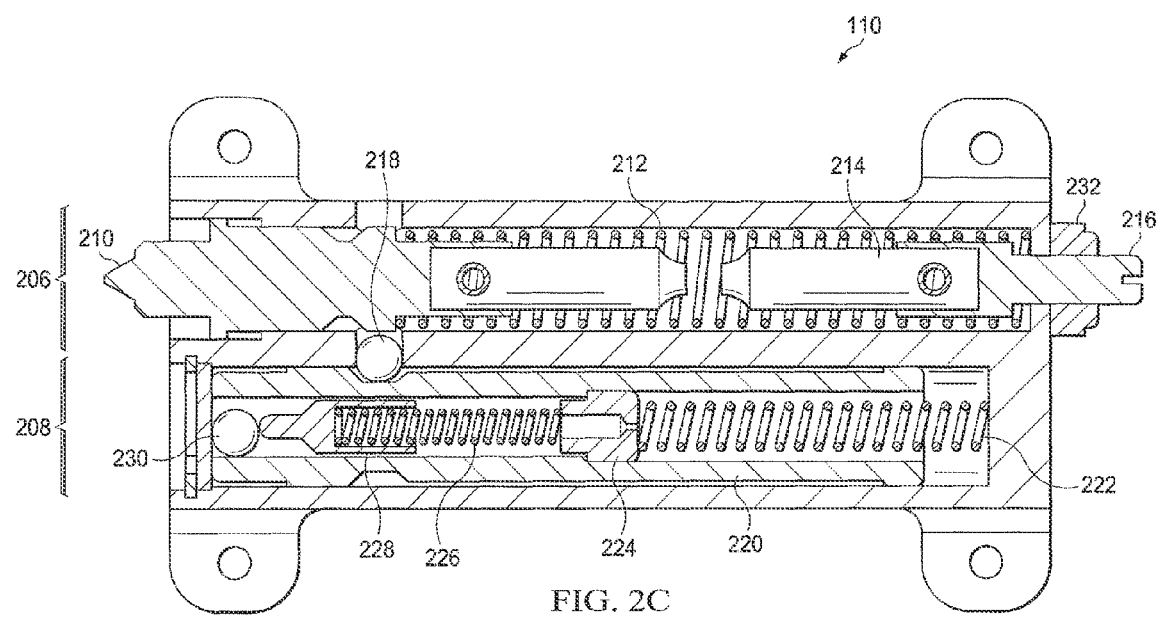
Figure 2D:
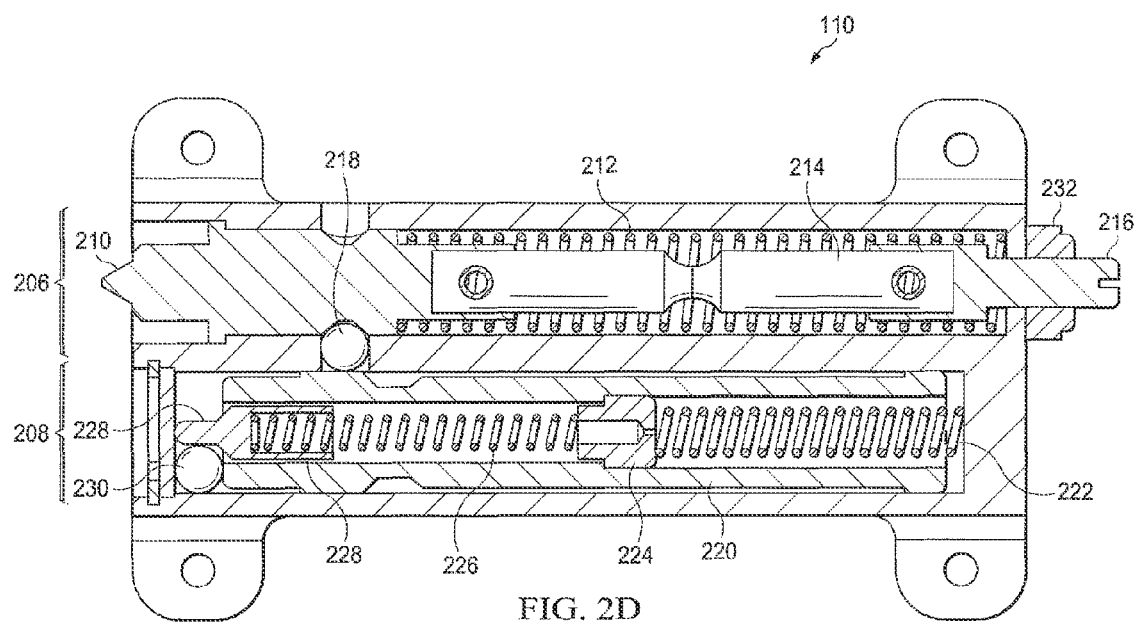
Figure 3:
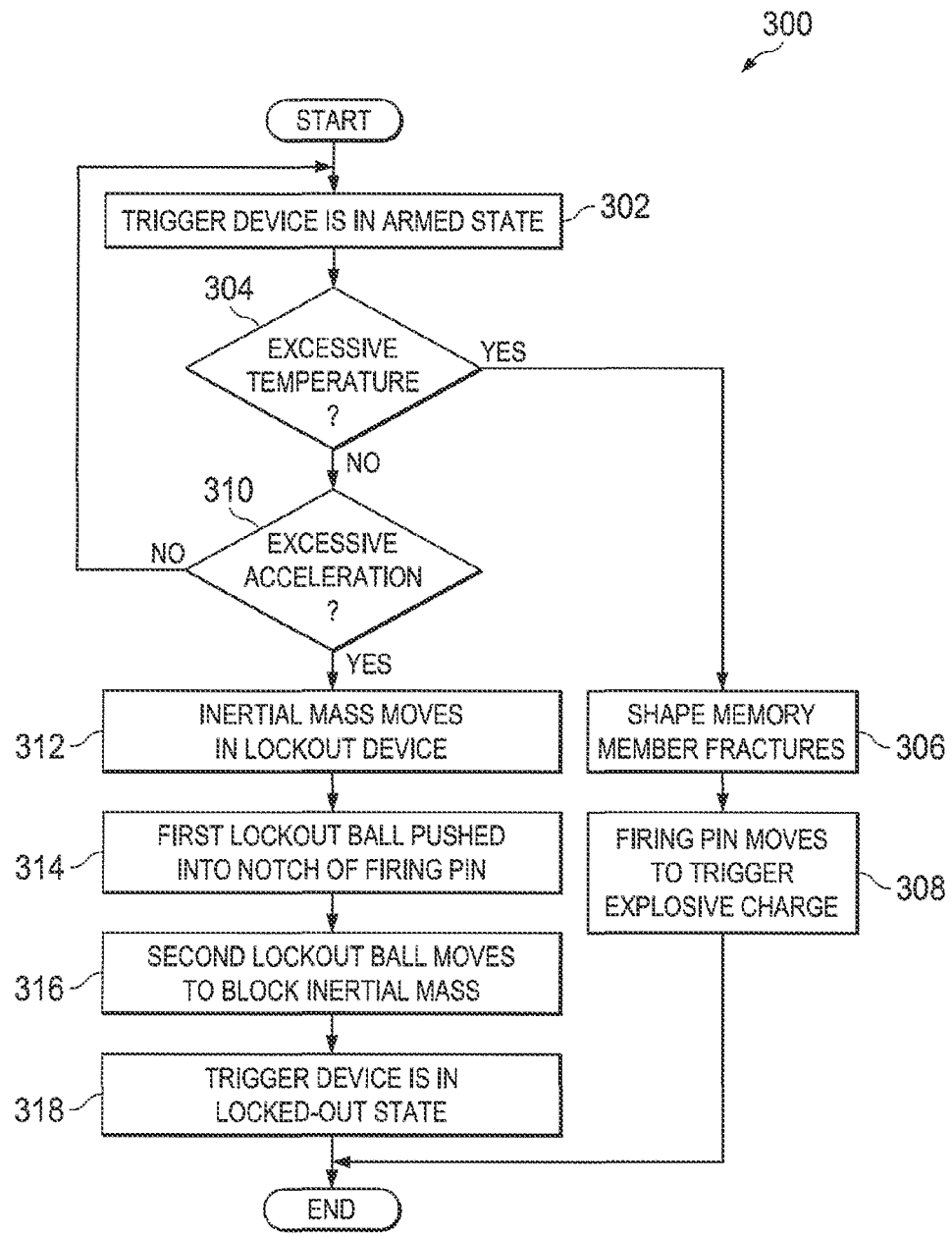
FIG. 3 illustrates an example method for operating a trigger of a thermally-initiated ventilation system or other system in accordance with this disclosure.

FIGS. 1 through 3, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

FIG. 1 illustrates an example flight vehicle 100 having a thermally-initiated ventilation system in accordance with this disclosure. The flight vehicle 100 here denotes a missile or rocket, although other forms of flight vehicles could also be used.

As shown in FIG. 1, the flight vehicle 100 includes a motor 102, a fuel 104, and a motor casing 106. The motor 102 uses the fuel 104 to generate thrust for the flight vehicle 100. The motor 102 denotes any suitable structure for generating thrust for a flight vehicle, and the fuel 104 denotes any suitable fuel used by a motor for generating thrust for a flight vehicle. In some embodiments, the motor 102 represents a rocket motor, and the fuel 104 represents a solid rocket fuel. The motor casing 106 encases the motor 102 and the fuel 104, and fins or other structures are routinely mounted on the motor casing 106. The motor casing 106 is typically formed from metal or other structurally-reinforcing material(s).

As noted above, in the event of a fire, the motor casing 106 could heat until the fuel 104 ignites. If the motor casing 106 remains substantially intact during the heating, ignition of the fuel 104 could result in detonation of the flight vehicle 100. To help avoid this problem, the flight vehicle 100 includes a thermally-initiated ventilation system, which includes at least one cutting charge 108. Each cutting charge 108 denotes at least one small explosive charge that when detonated can split, fracture, or otherwise damage the motor casing 106. The damage to the motor casing 106 helps to prevent detonation of the flight vehicle 100 if the flight vehicle 100 is subjected to an elevated temperature that ignites the fuel 104. Instead, the elevated temperature may simply cause the flight vehicle 100 to burn, which allows firefighting personnel to battle a fire without needing to worry about detonation of the flight vehicle 100.

The thermally-initiated ventilation system also includes at least one thermal trigger device 110, which is used to detonate the cutting charge(s) 108 in response to elevated temperature. As described in more detail below, the thermal trigger device 110 includes a shape memory trigger and an out-of-line lockout device. As explained below, the out-ofline lockout device includes an inertial mass with multiple lockout balls. In response to ignition of the motor 102 and a threshold amount of gravitational or "G" forces, the inertial mass moves one lockout ball to prevent a firing pin from being triggered. The inertial mass also releases another lockout ball, which permanently disables the thermal trigger device 110 and prevents the thermal trigger device 110 from detonating the cutting charge(s) 108.

The thermal trigger device 110 therefore provides a compact, simple, and dependable thermally-initiated trigger with a simple integrated out-of-line device. The thermal trigger device 110 is passively activated using the shape memory trigger, and the thermal trigger device 110 can be inexpensively manufactured and effectively operated in various installations. In some embodiments, the thermal trigger device 110 can be designed with rotationally-symmetric parts (allowing for manufacture using lathe-turning) or with flat-machined parts.

Although FIG. 1 illustrates one example of a flight vehicle 100 having a thermally-initiated ventilation system, various changes may be made to FIG. 1. For example, the thermally-initiated ventilation system could be used with any other suitable flight vehicle or other system where a thermal trigger is needed or desired.

FIGS. 2A through 2D illustrate an example thermal trigger device 110 with an out-of-line lockout device for a thermally-initiated ventilation system or other system in accordance with this disclosure. For ease of explanation, the thermal trigger device 110 is described as being used in the flight vehicle 100 of FIG. 1. However, the thermal trigger device 110 shown here could be used with any other suitable device or system.

As shown in FIG. 2A, the thermal trigger device 110 includes a housing 202. The housing 202 is used to encase and protect various other components of the thermal trigger device 110. The housing 202 can be formed from any suitable material(s) and in any suitable manner. For example, the housing 202 could be formed from one or more metals. In this example, the housing 202 has a flattened rectangular overall shape, although this is for illustration only. The housing 202 here include various holes 204, which can receive bolts or other structures for securing the thermal trigger device 110 in place. In some embodiments, the thermal trigger device 110 is insensitive to orientation about the longitudinal axis so that the trigger device 110 can be mounted on the top, side, or bottom of a motor 102 or motor casing 106 (as long as an inertial mass in the trigger device 110 can move in a desired direction).

As shown in FIGS. 2B through 2D, the thermal trigger device 110 also includes a shape memory trigger 206 and an out-of-line lockout device 208. The shape memory trigger 206 is configured to trigger denotation of a cutting charge or other explosive device. The out-of-line lockout device 208 is configured to disable the shape memory trigger 206, thereby preventing the shape memory trigger 206 from triggering denotation of a cutting charge or other explosive device. The lockout device 208 is referred to as an "out-of-line" lockout device because the lockout device 208 is not located within a linear path of the shape memory trigger 206.

As shown here, the shape memory trigger 206 includes a firing pin 210, a firing pin spring 212, a self-fracturing shape memory material member 214, and a shape memory material holder 216. The firing pin 210 denotes a structure that can be moved out of or away from the thermal trigger device 110 and strike an external object to trigger detonation of a cutting charge or other explosive device. The firing pin spring 212 is configured to rapidly expand and push the firing pin 210 when the shape memory material member 214 fractures. The shape memory material member 214 is attached to the firing pin 210 and the shape memory material holder 216. The shape memory material holder 216 is held in a fixed position in order to hold one end of the shape memory material member 214 in a fixed position.

When the shape memory material member 214 is unfractured as in FIG. 2B, the thermal trigger device 110 is in an armed state, meaning the shape memory trigger 206 is ready to cause movement of the firing pin 210 in response to elevated temperatures. If and when the shape memory material member 214 fractures as in FIG. 2C, the firing pin 210 is no longer retained by the shape memory material member 214 and the shape memory material holder 216, and the firing pin spring 212 pushes the firing pin 210 forward (to the left in FIG. 2C). In this condition, the thermal trigger device 110 is in a triggered state.

The firing pin 210 includes any suitable structure configured to move and strike an external object to trigger detonation of an explosive charge. The firing pin spring 212 includes any suitable coiled or other structure configured to move a firing pin. The shape memory material member 214 includes any suitable structure configured to change shape and fracture in response to elevated temperature. The shape memory material holder 216 includes any suitable structure configured to receive and retain part of a shape memory material member.

In some embodiments, the shape memory material member 214 can be fabricated by stretching a shape memory material to form an elongated structure, and the shape memory material can shrink when exposed to an elevated temperature. By securing the ends of the shape memory material member 214 to the firing pin 210 and the shape memory material holder 216, shrinkage of the shape memory material member 214 quickly causes the shape memory material member 214 to fracture.

The shape memory material member 214 can be formed from any suitable material(s), such as a shape memory alloy. As particular examples, the shape memory material member 214 could be formed from a nickel-titanium alloy (such as Nitinol), a titanium-nickel alloy, a copper-zinc-aluminum alloy, a copper-aluminum-nickel alloy, or a nickel-titanium-hafnium alloy. The shape memory material member 214 can also be formed in any suitable manner. In addition, the shape memory material member 214 can have any suitable size and shape, such as an elongated structure having one or more notches. In particular embodiments, the shape memory material member 214 can be designed to fracture at a desired temperature by selecting the composition, thickness, or notch size of the shape memory material member 214 or by controlling the amount of stretching used to fabricate the shape memory material member 214.

The lockout device 208 controls whether the firing pin 210 of the shape memory trigger 206 can move by controlling the location of a first lockout ball 218. In the armed state shown in FIG. 2B, the first lockout ball 218 remains out of a notch in the firing pin 210, allowing the firing pin 210 to move forward (to the left in FIG. 2C) when triggered. However, when the lockout device 208 disarms the shape memory trigger 206, the lockout device 208 pushes the first lockout ball 218 into the notch of the firing pin 210 as shown in FIG. 2D. The first lockout ball 218 prevents the firing pin 210 from moving forward even if the shape memory material member 214 fractures. The lockout ball 218 includes any suitable structure configured to be moved and to prevent movement of a firing pin. The lockout ball 218 could be formed from any suitable material(s) and have any suitable size and shape.

The lockout device 208 here includes an inertial mass 220, which is biased to the left as in FIGS. 2B and 2C using a spring 222. However, acceleration of the thermal trigger device 110 can cause the inertial mass 220 to move against the spring 222 and therefore push the first lockout ball 218 into the notch of the firing pin 210 as in FIG. 2D. The inertial mass 220 also includes a notch for the first lockout ball 218, and the first lockout ball 218 can remain in the notch of the inertial mass 220 until the inertial mass 220 moves and pushes the first lockout ball 218 into the notch of the firing pun 210.

The inertial mass 220 includes any suitable structure having a mass that moves in response to movement of a thermal trigger device. In this example, the inertial mass 220 denotes a cylindrical structure in which the spring 222 and other components of the lockout device 208 are located. The spring 222 includes any suitable coiled or other structure configured to bias an inertial mass in a particular direction.

The lockout device 208 also includes a dampening mechanism used to dampen acceleration forces applied to the inertial mass 220. In this example, the dampening mechanism is implemented using an orifice plug 224, which divides an internal cavity within the inertial mass 220. The orifice plug 224 defines a narrow passageway or orifice between the left and right portions of the internal cavity within the inertial mass 220. Air or other fluid within the internal cavity of the inertial mass 220 passes through the orifice plug 224, slowing movement of the inertial mass 220. The orifice plug 224 therefore provides dampening that can reduce or prevent inadvertent shock from moving the inertial mass 220 and disarming the thermal trigger device 110. For example, if the thermal trigger device 110 is dropped during shipment or installation, the inertial mass 220 experiences brief sharp accelerative forces, but the orifice plug 224 only allows the inertial mass 220 to move slightly (not enough to push the first lockout ball 218 into the notch of the firing pin 210). However, if the inertial mass 220 is subjected to adequate accelerative forces (such as during launch or flight of a flight vehicle), the orifice plug 224 allows the inertial mass 220 to move enough to push the first lockout ball 218 into the notch of the firing pin 210. The orifice plug 224 includes any suitable structure for dampening accelerative forces.

In addition, the lockout device 208 includes a lockout spring 226, a plunger 228, and a second lockout ball 230. As shown in FIG. 2B, in the armed state, the second lockout ball 230 remains within the inertial mass 220, and the lockout spring 226 pushes the plunger 228 against the second lockout ball 230. The lockout spring 226 is weaker than the spring 222, so the spring 222 keeps the inertial mass 220 pushed to the left in the figures.

Adequate acceleration of the thermal trigger device 110 allows the inertial mass 220 and the lockout spring 226 to overcome the force applied by the spring 222. When the inertial mass 220 moves to the right as shown in FIG. 2D, the second lockout ball 230 is pushed out of the inertial mass 220 by the lockout spring 226 and the plunger 228. The second lockout ball 230 is retained in a position outside the inertial mass 220 by the lockout spring 226 and the plunger 228. In this position, the second lockout ball 230 prevents the inertial mass 220 from moving back to the left in FIG. 2D, keeping the first lockout ball 218 pushed into the notch of the firing pin 210. This disarms the thermal trigger device 110 and prevents the thermal trigger device 110 from arming itself again. As a result, in response to launch or flight of the flight vehicle 100, the thermal trigger device 110 is disarmed and cannot be rearmed, thereby preventing the thermal trigger device 110 from triggering the cutting charge 108.

The lockout spring 226 includes any suitable coiled or other structure configured to push a plunger. The plunger 228 includes any suitable structure configured to push against and move a lockout ball. The plunger 228 could be formed from any suitable material(s) and have any suitable size and shape. The lockout ball 230 includes any suitable structure configured to be moved and to prevent movement of an inertial mass. The lockout ball 230 could be formed from any suitable material(s) and have any suitable size and shape.

As shown in these figures, the housing 202 defines two channels, one for the shape memory trigger 206 and one for the lockout device 208. The channels are linked by an opening for the first lockout ball 218. The channel for the shape memory trigger 206 includes an opening for the firing pin 210 and an opening for the shape memory material holder 216, where a nut 232 or other structure outside the housing 202 can be secured to the shape memory material holder 216. The channel for the lockout device 208 is opened at one end to allow for insertion of the lockout device 208, and a block 234 can be inserted into the channel to enclose the lockout device 208 in that channel. In addition, the housing 202 includes an opening 236, which can be used to view the position of the notch of the firing pin 210.

The thermal trigger device 110 here can have a very compact design. For example, in some embodiments, the housing 202 can have a length of about 3.4 inches (about 8.636 cm), a width of about 2 inches (about 5.08 cm), and a height of about 0.6 inches (about 1.524 cm). However, other larger or smaller embodiments having other dimensions could be used.

Although FIGS. 2A through 2D illustrate one example of a thermal trigger device 110 with an out-of-line lockout device for a thermally-initiated ventilation system or other system, various changes may be made to FIGS. 2A through 2D. For example, the relative sizes, shapes, and dimensions of the various components in FIGS. 2A through 2D are for illustration only. Also, other dampening mechanisms or lockout mechanisms could be used in the thermal trigger device 110.

FIG. 3 illustrates an example method 300 for operating a trigger of a thermally-initiated ventilation system or other system in accordance with this disclosure. For ease of explanation, the method 300 is described with respect to the thermal trigger device 110 of FIGS. 2A through 2D operating in the flight vehicle 100 of FIG. 1. However, the method 300 could be used with any other suitable thermal trigger device and in any other suitable device or system.

As shown in FIG. 3, a trigger device is in an armed state at step 302. This could include, for example, the shape memory material member 214 of the trigger device 110 remaining unfractured and the inertial mass 220 of the trigger device 110 not pushing the first lockout ball 218 into the notch of the firing pin 210. In this state, the trigger device 110 is armed and is able to trigger detonation of a cutting charge 108 or other explosive device. If the trigger device experiences an excessive temperature at step 304, the shape memory member fractures at step 306, and the firing pin moves in order to strike an explosive charge at step 308. This could include, for example, the shape memory material member 214 shrinking when exposed to the excessive temperature and fracturing in a notched area of the shape memory material member 214. The notched area of the shape memory material member 214 defines a reduced-width portion of the shape memory material member 214. This could also include the spring 212 pushing the firing pin 210 forward to strike an external cutting charge 108 or other explosive charge.

If the trigger device experiences an excessive acceleration at step 310, the trigger device transitions from the armed state to the disarmed or locked state. Due to the dampening provided within the trigger device (such as by the orifice plug 224), excessive acceleration could be defined as a multiple of standard gravity (multiple "G forces") for a prolonged period of time. During this time, an inertial mass moves within the trigger device at step 312, and a first lockout ball is pushed into the notch of the firing pin at step 314. This could include, for example, the inertial mass 220 moving slowly due to the dampening provided by the orifice plug 224. This could also include the inertial mass 220 pushing the first locking ball 218 into the notch of the firing pin 210, which prevents the firing pin 210 from moving significantly even if the shape memory material member 214 later fractures. A second locking ball moves into a position that blocks the inertial mass at step 316. This could include, for example, the lockout spring 226 causing the plunger 228 to push the second lockout ball 230 into a position that prevents the inertial mass 220 from moving back to its original position. This helps to prevent the first lockout ball 218 from moving out of the notch of the firing pin 210 after the inertial mass 220 pushes the first lockout ball 218 into the notch of the firing pin 210. The trigger device is therefore in a locked-out state at step 318. The trigger device 110 cannot trigger an explosive device even if the shape memory material member 214 fractures. Among other things, this prevents the trigger device 110 from detonating a cutting charge 108 after the launch vehicle 110 has been fired.

Although FIG. 3 illustrates one example of a method 300 for operating a trigger of a thermally-initiated ventilation system or other system, various changes may be made to FIG. 3. For example, while shown as a series of steps, various steps in FIG. 3 could overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. §112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. §112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device comprising:
   a thermal trigger comprising a firing pin, the thermal trigger configured to move the firing pin in response to an elevated temperature; and
   an out-of-line lockout device configured to disarm the thermal trigger in response to acceleration of the lockout device, the lockout device configured to move a first lockout ball into a notch of the firing pin to disarm the thermal trigger.

2. The device of claim 1, wherein the lockout device comprises:
   an inertial mass configured to move the first lockout ball into the notch of the firing pin; and
   a first spring configured to bias the inertial mass in an initial position.

3. The device of claim 2, wherein the lockout device further comprises:
   a second lockout ball configured, in response to movement of the inertial mass away from the initial position, to move into a position that prevents the inertial mass from returning to the initial position.

4. The device of claim 3, wherein the lockout device further comprises:
   a second spring and a plunger configured to push the second lockout ball into the position that prevents the inertial mass from returning to the initial position.

5. The device of claim 2, wherein the lockout device further comprises:
   a dampener configured to slow movement of the inertial mass.

6. The device of claim 5, wherein the dampener comprises an orifice plug dividing an internal cavity of the inertial mass, the orifice plug defining a narrow passageway through the orifice plug.

7. The device of claim 1, wherein the thermal trigger further comprises:
   a shape memory material member having a first end and a second end, the first end connected to the firing pin, the second end connected to a fixed location; and
   a second spring configured to move the firing pin in response to fracturing of the shape memory material member.

8. The device of claim 7, wherein:
   the shape memory material member comprises an elongated structure;
   the elongated structure is configured to decrease in length when exposed to the elevated temperature; and
   the elongated structure comprises at least one notch that defines a reduced-width portion of the elongated structure.

9. The device of claim 1, wherein the device is insensitive to orientation about a longitudinal axis of the device.

10. A system comprising:
 a motor casing; and
 a device comprising:
  a thermal trigger comprising a firing pin, the thermal trigger configured to move the firing pin in response to an elevated temperature and trigger an explosive device that damages the motor casing; and
  an out-of-line lockout device configured to disarm the thermal trigger in response to acceleration of the lockout device, the lockout device configured to move a first lockout ball into a notch of the firing pin to disarm the thermal trigger.

11. The system of claim 10, wherein the lockout device comprises:
 an inertial mass configured to move the first lockout ball into the notch of the firing pin; and
 a first spring configured to bias the inertial mass in an initial position.

12. The system of claim 11, wherein the lockout device further comprises:
 a second lockout ball configured, in response to movement of the inertial mass away from the initial position, to move into a position that prevents the inertial mass from returning to the initial position.

13. The system of claim 12, wherein the lockout device further comprises:
 a second spring and a plunger configured to push the second lockout ball into the position that prevents the inertial mass from returning to the initial position.

14. The system of claim 11, wherein the lockout device further comprises:
 a dampener configured to slow movement of the inertial mass, the dampener comprising an orifice plug dividing an internal cavity of the inertial mass, the orifice plug defining a narrow passageway through the orifice plug.

15. The system of claim 10, wherein the thermal trigger further comprises:
 a shape memory material member having a first end and a second end, the first end connected to the firing pin, the second end connected to a fixed location; and
 a second spring configured to move the firing pin in response to fracturing of the shape memory material member.

16. The system of claim 15, wherein:
 the shape memory material member comprises an elongated structure;
 the elongated structure is configured to decrease in length when exposed to the elevated temperature; and
 the elongated structure comprises at least one notch that defines a reduced-width portion of the elongated structure.

17. The system of claim 10, further comprising:
 a flight vehicle comprising the motor casing; and
 a cutting charge comprising the explosive device.

18. A method comprising:
 disarming a thermal trigger that comprises a firing pin, the thermal trigger configured to move the firing pin in response to an elevated temperature;
 wherein disarming the thermal trigger comprises using an out-of-line lockout device to disarm the thermal trigger in response to acceleration of the lockout device, the lockout device configured to move a first lockout ball into a notch of the firing pin to disarm the thermal trigger.

19. The method of claim 18, wherein using the out-of-line lockout device to disarm the thermal trigger comprises:
 moving an inertial mass away from an initial position in response to the acceleration of the lockout device;
 pushing the first lockout ball into the notch of the firing pin using the inertial mass; and
 in response to movement of the inertial mass away from the initial position, moving a second lockout ball into a position that prevents the inertial mass from returning to the initial position.

20. The method of claim 19, further comprising:
 dampening acceleration forces applied to the inertial mass to prevent unintended disarming of the thermal trigger by the out-of-line lockout device.

* * * * *